(12) United States Patent
Mikkonen et al.

(10) Patent No.: US 8,224,906 B2
(45) Date of Patent: Jul. 17, 2012

(54) INTERACTING WITH A USER OF A MESSAGING CLIENT

(75) Inventors: Jussi Mikkonen, Tuusula (FI); Mark Sorsa-Leslie, Kirkkonummi (FI)

(73) Assignee: Tieto Oyj, Helsinki (FI)

( * ) Notice: Subject to any disclaimer, the term of this patent is extended or adjusted under 35 U.S.C. 154(b) by 1492 days.

(21) Appl. No.: 11/654,336

(22) Filed: Jan. 17, 2007

(65) Prior Publication Data
US 2008/0089490 A1  Apr. 17, 2008

(51) Int. Cl.
*G06F 17/27* (2006.01)
*G06F 15/16* (2006.01)
*H04L 12/58* (2006.01)
*H04Q 7/20* (2006.01)

(52) U.S. Cl. .............. 709/206; 455/412.1; 455/466; 709/203; 709/219; 704/9

(58) Field of Classification Search .............. 709/206, 709/219, 203; 379/88.13, 88.17; 704/7, 704/9; 455/466, 412.1
See application file for complete search history.

(56) References Cited

U.S. PATENT DOCUMENTS

| 5,404,295 | A | 4/1995 | Katz et al. | |
|---|---|---|---|---|
| 5,454,106 | A | 9/1995 | Burns et al. | |
| 6,430,602 | B1 * | 8/2002 | Kay et al. | 709/206 |
| 6,775,358 | B1 * | 8/2004 | Breitenbach et al. | 379/88.13 |
| 7,454,469 | B2 * | 11/2008 | Zhou et al. | 709/206 |
| 7,627,466 | B2 * | 12/2009 | Ramsey et al. | 704/9 |
| 7,693,274 | B2 * | 4/2010 | Eppel et al. | 379/265.01 |
| 2004/0049375 | A1 * | 3/2004 | Brittan et al. | 704/9 |
| 2005/0050151 | A1 * | 3/2005 | Mitchell et al. | 709/207 |
| 2005/0102286 | A1 * | 5/2005 | McBride et al. | 707/5 |
| 2005/0125370 | A1 * | 6/2005 | Brennan et al. | 706/47 |
| 2006/0010240 | A1 * | 1/2006 | Chuah | 709/228 |
| 2006/0156063 | A1 | 7/2006 | Mazzarella et al. | |
| 2006/0259555 | A1 * | 11/2006 | Hassounah et al. | 709/206 |
| 2007/0038436 | A1 * | 2/2007 | Cristo et al. | 704/9 |
| 2007/0124502 | A1 * | 5/2007 | Li | 709/246 |
| 2007/0168480 | A1 * | 7/2007 | Biggs et al. | 709/223 |
| 2007/0240118 | A1 * | 10/2007 | Keren | 717/124 |
| 2008/0056460 | A1 * | 3/2008 | Odinak et al. | 379/88.14 |
| 2008/0077653 | A1 * | 3/2008 | Morris | 709/203 |

(Continued)

FOREIGN PATENT DOCUMENTS

WO   WO 01/90953   11/2001

*Primary Examiner* — Lisa Hashem
(74) *Attorney, Agent, or Firm* — Fay Sharpe LLP

(57) ABSTRACT

The invention discloses a method, computer system and computer program of interacting with a user of a messaging client. In the method a transactive engine engages via an agent, a natural language interaction with a user of a messaging client in order to initiate a transaction and determines, based on an adaptive script of the agent, the semantics of natural language input from the user. The existing form of the script is adapted to take into account historical interaction between the agent and the user and historical interaction between other users and the agent. The transactive engine constructs at least one command necessary to execute the transaction and transmitting the at least one command to at least one information system in order to execute the transaction. Furthermore, the transactive engine receives information about the executed transaction from the at least one information system, processes the received information relating to the executed transaction to form a natural language response to the user of the messaging client, and sends the natural language response to the messaging client.

18 Claims, 2 Drawing Sheets

U.S. PATENT DOCUMENTS

| | | | |
|---|---|---|---|
| 2008/0109788 A1* | 5/2008 | Prieto | 717/115 |
| 2008/0154828 A1* | 6/2008 | Antebi et al. | 706/46 |
| 2008/0275951 A1* | 11/2008 | Hind et al. | 709/204 |
| 2009/0035733 A1* | 2/2009 | Meitar et al. | 434/118 |
| 2009/0216851 A1* | 8/2009 | Digate et al. | 709/206 |
| 2010/0057443 A1* | 3/2010 | Di Cristo et al. | 704/9 |
| 2010/0191812 A1* | 7/2010 | O'Donovan | 709/206 |
| 2010/0312549 A1* | 12/2010 | Akuwudike | 704/9 |
| 2011/0106527 A1* | 5/2011 | Chiu | 704/9 |
| 2011/0231182 A1* | 9/2011 | Weider et al. | 704/9 |
| 2012/0060147 A1* | 3/2012 | Hong et al. | 717/113 |

\* cited by examiner

INTERACTING WITH A USER OF A MESSAGING CLIENT

FIELD OF THE INVENTION

The present invention relates instant messaging. More particularly, the present invention relates to a method, computer program and system of implementing an electronic transaction using instant messaging.

BACKGROUND OF THE INVENTION

Messaging between people has become a very important factor in the Internet. Messaging itself can be divided into two general subcategories: offline messaging and online messaging. Offline messaging refers to solutions in which there is not an online or real-time connection between two or more parties. Examples of the most used offline messaging solutions comprise emails, short messages of a mobile communication network etc. Online messaging refers to solutions in which two or more parties may interact via a data communication network essentially in real-time. A more common term for online messaging is instant messaging. Instant messaging is a form of real-time communication between two or more parties based on typed text or speech. The text or speech is conveyed via computers or mobile terminals connected over a network such as the Internet.

In practice instant messaging requires the use of a client program. The client program is in contact with an instant messaging service or instant messaging server. One of the most common features of instant messaging services is that they offer presence information that indicates if people on one's list of contacts are currently online in the instant messaging service. Examples of instant messaging service include AOL Instant Messenger, Yahoo! Messenger, Skype, Google Talk, .NET Messenger Service etc. The advantage of the instant message service compared e.g. to emails is that the parties usually are able to know whether the peer is available.

Although disclosed above, the parties of instant messaging service need not always be 'all humans'. A software agent (sometimes referred to as a 'bot') may interact with other network services intended of people as it were a person. The bot may e.g. be used to gather information.

U.S. 2006/0156063 (Mazzarella et al) discloses a system and method that allow an instant messaging user device to conduct transactions with transaction systems that do not natively allow instant messaging inputs or message processing. An intermediate functionality translates or transforms instant messaging messages from the user device into non-instant messaging communications that can be processed by the transaction system and translates or transforms non-instant messaging communications from the translation system into instant messaging communications for the user device.

U.S. Pat. No. 6,430,602 (Active Buddy) discloses a method and system for interactively responding to queries from a remotely located user includes a computer server system configured to receiving an instant message query or request from the user over the Internet. The query or request is interpreted and appropriate action is taken, such as accessing a local or remote data resource and formulating an answer to the user's query. The answer is formatted as appropriate and returned to the user as an instant message or via another route specified by the user. A method and system of providing authenticated access to a given web page via instant messaging is also disclosed.

The prior art solutions, however, have drawbacks. Prior art scripts of agents, that is, transactions bots, are static with limited input possibilities. If a script needs to be changed, this has to be made manually to take into account possible user errors that are experienced or language that is not understood. Furthermore, a user has a limited way to interact with a back-end system that executes the transaction.

Based on the above there is an obvious need for a solution that would mitigate and/or alleviate the above drawbacks.

SUMMARY OF THE INVENTION

According to a first aspect there is provided method of interacting with a user of a messaging client. The method comprises engaging, with a transactive engine via an agent, a natural language interaction with a user of a messaging client in order to initiate a transaction; determining, based on an adaptive script of the agent, the semantics of natural language input from the user, wherein the existing form of the script is adapted to take into account historical interaction between the agent and the user and historical interaction between other users and the agent; constructing at least one command necessary to execute the transaction; transmitting the at least one command to at least one information system in order to execute the transaction; receiving information about the executed transaction from the at least one information system; processing the received information relating to the executed transaction to form a natural language response to the user of the messaging client; and sending the natural language response to the messaging client.

In one embodiment of the invention, the script comprises conversational elements, logic functions and needed data objects.

In one embodiment of the invention, the method further comprises: requesting further information, based on the adaptive script, from the user when all data objects of the script cannot be determined.

In one embodiment of the invention, the method further comprises: performing at least one action before relaying the at least one command to the at least one information system or after receiving the information about the executed transaction from the at least one information system.

In one embodiment of the invention, the at least one action comprises at least one of the following: assessing authority of the user to conduct the transaction; informing the user when the user does not have authority to conduct the transaction; assessing the charge for processing the transaction based on at least one of the type of the transaction, frequency of the transaction, time, date, user and enterprise; storing the transaction request; logging user activity relating to the transaction request; authenticating that the user has been granted access to the agent; applying an appropriate charge to an appropriate account for collection from the beneficiary of the transaction; creating a report for the beneficiary of the transaction; and checking the beneficiary that the user is transacting with.

In one embodiment of the invention, when the transaction fails, the method further comprises: informing the user about the failure of the transaction; and requesting additional information from the user via the agent.

In one embodiment of the invention, the method further comprises: using at least one of user information, user status information, historical interaction data between the agent and the user, and the adaptive script of the user to determine when and/or how to initiate interaction with the user.

In one embodiment of the invention, the method further comprises: creating a master agent that combines scripts of multiple other agents.

In one embodiment of the invention, the method further comprises: contacting, with the agent, a third party during the natural language interaction with the user.

According to a second aspect there is provided a computer program comprising program code, which when executed on a data processing device, is adapted to perform the method of interacting with a user of a messaging client. In one embodiment, the computer program is embodied on a computer-readable medium.

According to a third aspect there is provided a computer system of interacting with a user of a messaging client. The computer system comprises a transactive engine configured to engage, via an agent, a natural language interaction with the user in order to initiate a transaction, to determine, based on an adaptive script of the agent, the semantics of natural language input from the user, wherein the existing form of the script is adapted to take into account historical interaction between the agent and the user and historical interaction between other users and the agent, and to construct at least one command necessary to execute the transaction, to transmit the at least one command to at least one information system in order to execute the transaction, and to receive information about the executed transaction from the at least one information system, to process the received information relating to the executed transaction to form a natural language response to the user, and to send the natural language response to the user.

In one embodiment of the invention, the adaptive script comprises conversational elements, logic functions and needed data objects.

In one embodiment of the invention, the transactive engine (is configured to request further information, based on the adaptive script, from the user when all data objects of the adaptive script cannot be determined.

In one embodiment of the invention, the transactive engine is configured to perform at least one action before relaying the at least one command to the at least one information system or after receiving the information about the executed transaction from the at least one information system.

In one embodiment of the invention, the transactive engine is configured to perform at least one of the following: assess authority of the user to conduct the transaction; inform the user when the user does not have authority to conduct the transaction; assess the charge for processing the transaction based on at least one of the type of the transaction, frequency of the transaction, time, date, user and enterprise; store the transaction request; log user activity relating to the transaction request; authenticate that the user has been granted access to the agent; apply an appropriate charge to an appropriate account for collection from the beneficiary of the transaction; create a report for the beneficiary of the transaction; and check the beneficiary that the user is transacting with.

In one embodiment of the invention, the transactive engine is configured to inform the user about the failure of the transaction, and to request additional information from the user via the agent.

In one embodiment of the invention, the transactive engine is configured to use at least one of user information, user status information, historical interaction between the agent and the user, and the adaptive script of the user to determine when and/or how to initiate interaction with the user.

In one embodiment of the invention, the transactive engine comprises a master script for a master agent, wherein the master script combines scripts of multiple other agents.

According to a fourth aspect of the invention there is provided a method of updating a script of an agent in a transactive engine. The method comprises: storing historical natural language interaction between the agent and a user; storing historical natural language interaction between other users and the agent; and adapting the script to take into account the stored historical interaction between the agent and the user and the stored historical interaction between other users and the agent.

According to a fifth aspect of the invention there is provided a computer program comprising program code, which when executed on a data processing device, is adapted to perform the method of updating a script of an agent in a transactive engine. In one embodiment of the invention, the computer program is embodied on a computer-readable medium.

According to a sixth aspect of the invention there is provided a semantic engine configured to update a script of an agent. The semantic engine is configured to store historical natural language interaction between the agent and a user, to store historical natural language interaction between other users and the agent; and to adapt the script to take into account the stored historical interaction between the agent and the user and the stored historical interaction between other users and the agent.

The invention has several advantages over the prior art solutions. The solution in the invention learns personal behavior and allows the user to use their own language to interact with. Furthermore, it acts as a system buddy and is added to a list of contacts in exactly the same way as other contacts. The invention adapts the scripts based on both individual and group interaction with the agent and thus enables a higher probability to recognize and determine user input. Furthermore, in one embodiment the solution disclosed in the invention it learns the habits of the user, remembering e.g. input style, time of entry, preferred options, etc. It may also utilise presence and mood information set by the user to provide permission to the agent (transmission bot) to contact the user. Furthermore, in one embodiment it provides the ability to involve more than one agent or another user in the conversation, providing opportunities for multiple person and multi-agent interaction. Moreover, in one embodiment it can automatically discover and provision an agent based on the back-end system data objects and logic.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
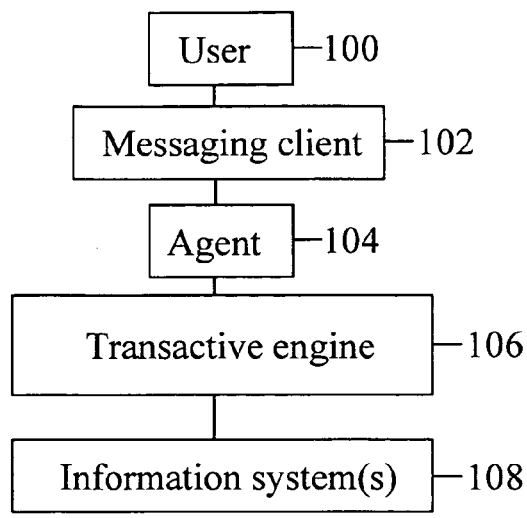
FIG. 1 discloses a general block diagram of a system according to one embodiment of the invention, FIG. 2 discloses a flow diagram of a method according to one embodiment of the invention, FIG. 3 discloses a block diagram of a transactive engine according to one embodiment of the invention.

FIG. 1 discloses a general block diagram illustrating one embodiment of the invention. A user 100 is using a messaging client 102. The messaging client is e.g. an instant messaging client or software that performs the function of Instant Messaging, using compatible protocols. With the messaging client 102 the user 100 interacts with a software agent 104, in other words, with a transaction bot. The user 100 sees the transaction bot 104 as any other user with which he can interact with. A transactive engine 106 is software that provides the main functionality of the invention. A transaction itself is executed in an information system or information systems 108. The general functionality of the invention is disclosed in FIG. 2.

Figure 2:
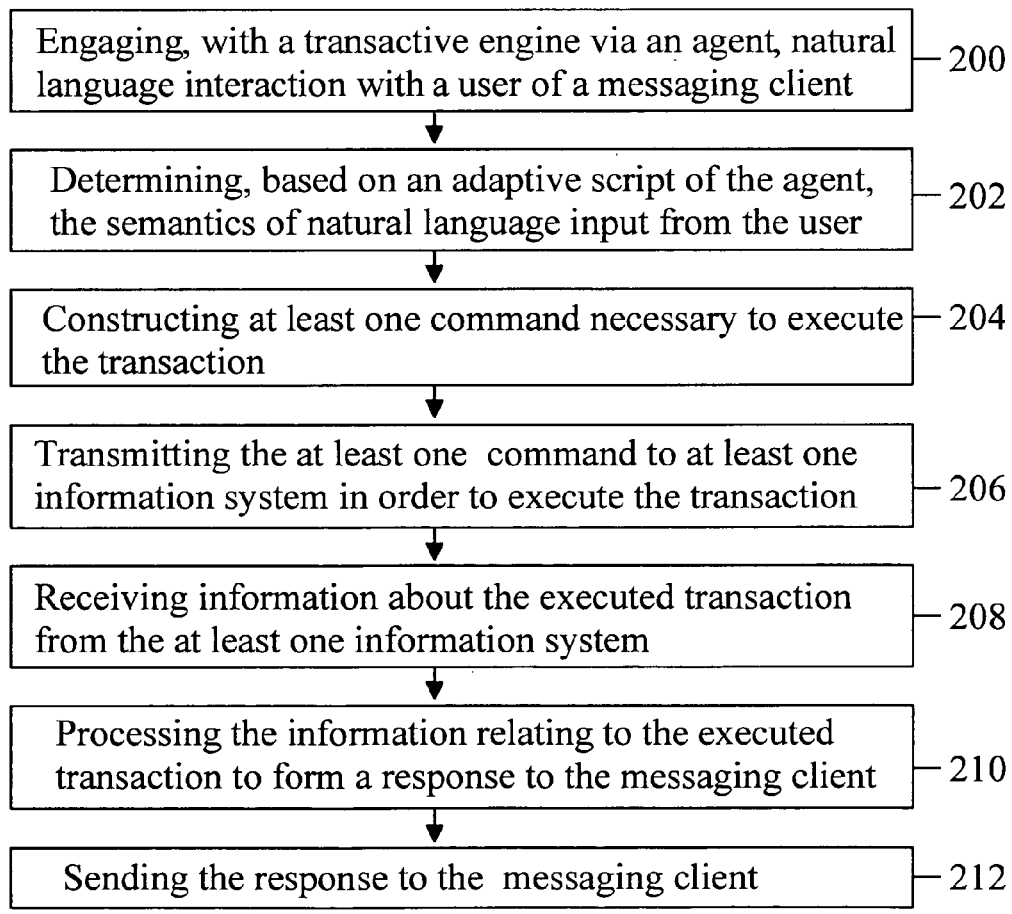

FIG. 2 discloses general flow diagram of a method according to one embodiment of the invention. The transactive engine 106 engages via the transactive bot 104 a natural language interaction with the user 100 of the messaging client 102 in order to initiate a transaction, step 200. The phrase 'natural language interaction' may refer to voice or text interaction which takes place in a conversational manner and normal sentences. The transactive engine 106 determines, based on an adaptive script of the transactive bot 104, the semantics of natural language input from the user 100, step 202. The script determines the functionality and behavior of the transactive bot 104, and it comprises e.g. conversational elements, logic functions and needed data objects. The existing form of the script is adapted to take into account historical interaction between the agent and the user and historical interaction between other users and the agent. In other words, the transactive bot 104 may e.g. take into account the way how the user interacts with the bot 104. Based on the determination, the transactive engine 106 constructs at least one command necessary to execute the transaction, step 204. In step 206, the at least one command is transmitted to the at least one information system 108 in order to execute the transaction. In one embodiment, a single information system may execute the transaction. In an alternative embodiment, the execution of the transaction is fragmented into several information systems. In step 208 information about the executed transaction is received from the at least one information system 108. In step 210, the information relating to the executed transaction is processed to form a response to the messaging client 102. In other words, information relating to the executed transaction is converted into a more appropriate form to the user 100 of the messaging client 102. Finally, in step 212, the response is sent to the instant messaging client.

Figure 3:
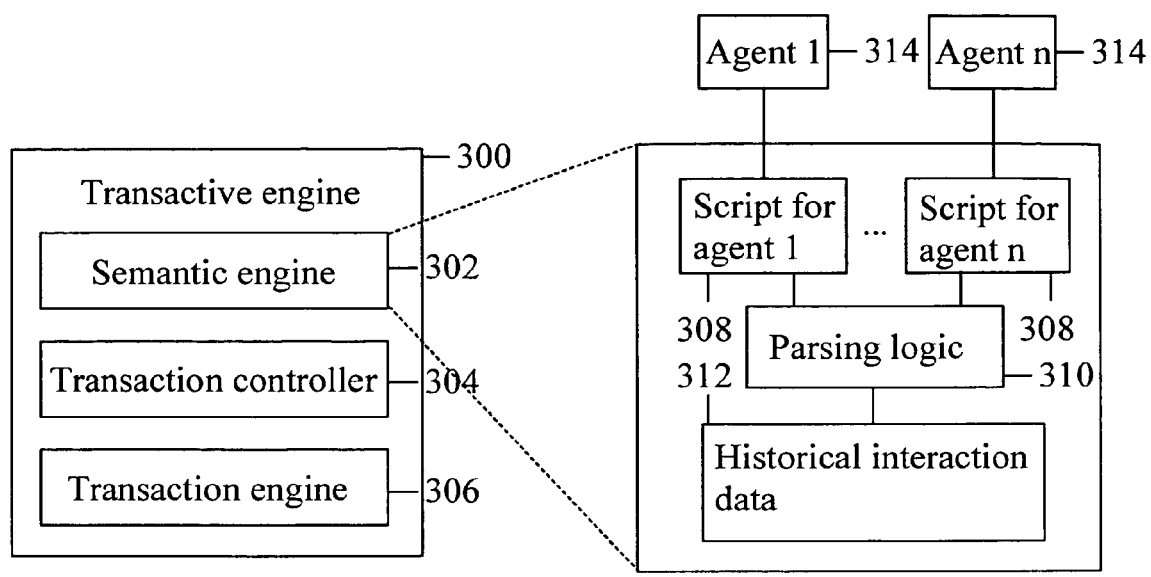

FIG. 3 discloses a block diagram illustrating a transactive engine 300 according to one embodiment of the invention. FIG. 3 discloses the structure of transactive engine 300 in a more detailed manner. The transactive engine 300 comprises three main parts: a semantic engine 302, a transaction controller 304 and a transaction engine 306. The semantic engine 302 holds the scripts 308 of different transaction bots 314 and provides the parsing, understanding and learning capabilities of the transaction bots. The transaction controller 304 captures the transaction flows from the semantic engine 302 and attached appropriate information needed e.g. to charge for the transaction. The transaction engine 306 provides the connection to one or more information systems.

A user starts a messaging client on a terminal, such as a mobile phone, a personal computer or a personal digital assistant. The messaging client is preferably compliant with industry standard instant messaging protocols allowing the user a choice of client software. The user selects a desired transaction bot e.g. from a 'buddy list' of the messaging client and begins to chat with the transaction bot e.g in natural language, e.g. speech or text. If the user does not have the transaction bot in the buddy list, he may add it by utilizing normal messaging client procedures for adding buddies. Once the transaction bot is added to the buddy list, it appears as a normal user, including e.g. presence settings.

The user of the messaging client may utilize native language, chat language, program codes, or a combination in a string, for example, "Book a flight to Stockholm on Dec. 9, 2006 to meet N.N of TietoEnator".

The user enters the phrase into the messaging client and waits for response from the transaction bot. The transaction bot accepts the input as a messaging chat dialogue and passes the input to the transactive engine 300 e.g. as a text string.

The transaction engine 300 determines the meaning of the user input by first passing the user input to an automatic semantic language parser, that is, to the semantic engine 302. The semantic engine 302 assesses the meaning of the input string. In an ideal case, the semantic engine 302 is directly able to extract the anticipated data objects from the input string. For example, 'book', 'flight', 'Stockholm', 'Dec. 9, 2006' and 'N.N' represent data fields transaction, transport, destination, date and customer.

FIG. 3 also gives an example of a more detailed structure for the semantic engine 302. In this embodiment, the semantic engine 302 comprises parsing logic 310 that is configured to parse the meaning of the chat from natural language from the user and to translate that to a command or commands understood by a receiving system. The parsing may use fuzzy logic, artificial intelligence and contexts it has learned to determine the most likely command. The semantic engine 302 further comprises a script 308 for each transaction bot 314 (i.e. agent). A script 308 determines the functionality and behavior of a corresponding transactive bot, and it comprises e.g. conversational elements, logic functions and needed data objects. In this embodiment, the script is not static but adaptive by its nature. The learning ability of the semantic engine 302 will add to the script with both personal and also other than personal approaches to conversations. In other words, the semantic engine 302 updates the scripts 308 based on historical interaction data 312 between the corresponding transaction bot and the user and historical interaction between other users and the transaction bot. As disclosed above, the transaction bot will develop over time, by supplementing its abilities based on the user interaction. This means it will look at the conversation and assess the context. It may use this context to select based on probability the most likely next part of the conversation. This means that there is no single route through the transaction. It may be entirely driven by the way the user interacts with the service. The meaning of the conversation is derived using e.g. artificial intelligence and the whole input from the user is important, not just the keywords. This makes the system entirely focused on the provision of a personal service from the transaction bot.

In the beginning, the script of a transaction bot is as it is set, but it may then become personalized to each user through their interaction. In one embodiment, this is accomplished by storing e.g. the interaction history and personalized definitions for each user, and adding them to the pool of interactions and definitions for that script. For example, there may be 15 ways to ask a question in a script. The user asks a slightly different way, and the semantic engine assesses the probability what the question may be about. It may request clarification from the user, and once it has this clarification information, it adds the new question to the group of 15 already established.

The semantic engine 302 stores all of the interactions between the user and the transaction bot until the "script" is complete. Then the semantic engine 302 constructs the appropriate command/series of commands necessary to execute the transaction and passes the commands to the transaction controller 306. The transaction controller 306 may be configured to implement at least one of the following tasks:

Assess the user's authority to conduct the transaction. If the user does not have the authority, the transaction controller 306 informs the semantic engine 302 that sends the user a message via the transaction bot.

Assess the charge for processing that transaction, based on various factors, such as the type of transaction, frequency, time, date, user, enterprise, etc.

Record the transaction request and logs the user activity.

Send the transaction to the transaction engine 306 for transmission to one or more information systems.

Receive a confirmation of the transaction success and record the transaction as "processed". If the transaction failed, the transaction controller 304 informs the semantic engine 302 of the failure, and the semantic engine 302 continues to request information from the user via the transaction bot.

Apply an appropriate charge to an appropriate account for collection from a beneficiary of the transaction.

Inform the semantic engine 302 of the transaction success.

Create reports necessary to the beneficiary of the transaction.

Ensure that the user is still valid.

Ensure that the user is not trying to undertake a transaction outside of his authorization limits.

Ensure that the beneficiary is not blacklisted.

If all the data objects of the scripts are not complete or if the semantic engine 302 has not understood fully, it may return back to the user (that is, to the messaging client), in the form of a reply to the chat, a clarification question or questions. In one embodiment, the semantic engine 302 may propose the most common option of missing information as a primary alternative for the user in case of an incomplete transaction. When the user has done similar transactions earlier, the semantic engine 302 may use earlier choices and behavior as a preference.

When the command(s) and checks are complete, the transaction engine 306 transmits the command or commands to underlying information system or systems in accordance with the operation of the information system. The information system is e.g. an internal information system of a corporate or a commercial information system providing a particular service, e.g. hotel room booking, flight reservation etc. In one embodiment, there may be an integration layer that provides the necessary application logic between the transactive engine 300 and the information systems. In one embodiment of the invention, one transaction may be executed partially in two or more information systems 210.

The transaction is executed on the underlying information system and after executing the transaction, the results are sent back to the transactive engine 300. As disclosed above, the transaction controller 304 may process the results before passing them further to the semantic engine 302. The semantic engine 302 translates the results into natural language, that is, to language that is used in the messaging between the messaging client and the transaction bot, and sends the results as natural language to the user. For example, a natural language response might be "OK, flight SK867 HEL-ARL booked for 0800 on Dec. 9, 2006 at a cost of €300". The reply is provided to the user in the same chat session through the messaging client.

In one embodiment of FIG. 3, each transaction bot has its own transaction area. For example, one transaction bot can be used to implement airline reservations, another to book hotel rooms etc. Of course, in an alternative embodiment, it is possible to have a single general transaction bot that can be used for various transactions. In this case it is possible to create a single script that combines scripts from multiple transaction bots and allows a user to interact with multiple systems through a single transaction bot.

In one embodiment of FIG. 3, monetary functionalities relating to transactions are automatically handled by the transactive engine 300. For example, transaction costs are charged to beneficiaries and transaction income is collected automatically. Furthermore, partner shares of transaction income may be stored alongside the transaction pricing enabling an automatic calculation of partner income allocations. Moreover, partner transaction income may be allocated automatically. Furthermore, the solution disclosed in the invention is also able e.g. to the charge for each transaction (which is not to be confused with the payment of the transaction-related service or product). Therefore, the invention may also be used within a company that provides various company-related in-house services for its employees. Of course, the in-house service may also require using some commercial services from outside the company.

In one embodiment of FIG. 3, a transaction bot accepts any natural language input from the user, and where necessary, it will seek clarification from the user in order to learn the meaning directly from the user. The secondary input from the user may then be used to create a context for the initial input, and this information will be stored in a contextual database along with the user information within the semantic engine 302. This will allow the semantic engine 302 to remember user input style and "special commands" and translate these to valid commands.

In one embodiment of FIG. 3, a transaction bot may be proactive. In other words, based on e.g. user's presence information the transaction bot may start e.g. a dialogue of "You have unapproved travel expenses, deadline for approvals is tomorrow, do you want to handle those now?". The transaction bot may use previous conversations to understand when and how to interact with the user, and e.g. user presence and mood information to augment that understanding. For example, if I have taken 5 minutes to complete a transaction in the past (learned by the semantic engine 302 as a result of the conversations in the past), and I have 15 min window in my diary (from my diary information that the transaction bot has access to), and I am available (based on my presence information) and I am working (based on my mood information), then the transaction bot may contact me to ask to conduct the above transaction.

In one embodiment of FIG. 3, a transaction bot or the transactive engine 300 may have ground knowledge about a user, e.g. home and business addresses, phone numbers, email addresses etc. For example, when ordering a digital camera the transaction bot merely asks "home or business address" and an answer "home" is enough.

In one embodiment of FIG. 3, the transactive engine 300 may be a learning one. For example, the transactive engine 300 may scan information systems' 108 interfaces or databases. Based on the scans, the transactive engine 108 may create new transactions and proposes those to a moderator who may confirm the result and release the new transaction for public use.

In one embodiment of FIG. 3, it is possible to create new transaction bots by creating new scripts. The activation of a new transaction bot is different. This may be automated, with the transactive engine 300 looking for systems inside e.g. a beneficiaries environment that provide a good match for the data objects in the transaction bot's script. This allows e.g. automatic or semi-automatic provisioning of transaction bots, and may also allow the transactive engine to suggest new transaction bots proactively based on new transaction bot being added to changes to e.g. the beneficiaries' environment.

In one embodiment of FIG. 3, settings (e.g. presence status, mood status etc.) of a user are used by a transaction bot to interact with the user. With the settings, the user is able to affect to the interaction between the transaction bot and the user, that is, e.g. when the transaction bot may contact the user and what it can contact the user about. This may also allow the user to receive notifications from new transaction bots based on the user's presence and mood. Furthermore, the transactive engine may be configured to capture user's personal interaction methods, and information relating to the user may be stored and reused in the transactive engine to improve the quality of user interaction with the transaction bot. This includes e.g. phrases the user uses, time of transaction bot usage, frequency of interaction with transaction bots and what does the user typically do with the transaction bot.

In one embodiment of FIG. 3, a user engages a natural language interaction with a user of a messaging client with a transactive engine via an agent, that is, a transaction bot. At some point it may e.g. happen that the transaction bot may start to converse with the user and the user gets stuck. The transaction bot may contact another human being (e.g. an administrator) or another transaction bot that will join the conversation to provide assistance. For example, a search transaction bot would allow the user to search for something prior to completing the transaction or a human assistant to help me with an error. This means that the transaction is paused, and a discussion is started with a third party. Once the third party leaves the conversation, the transaction continues to completion or close.

The invention is implemented e.g. with software comprising code, which when executed on a data processing device, is adapted to perform the various step disclosed in the methods of the invention. It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method of interacting with a user of a messaging client, wherein the method comprises:
   using user-specific information to initiate, with a transactive engine via an agent, a natural language interaction with a user of a messaging client in order to initiate a transaction;
   determining, based on an existing form of an adaptive script of the agent, a semantics of natural language input from the user, wherein the existing form of the adaptive script changes after its creation and is adapted to take into account historical interaction between the agent and the user and historical interaction between other users and the agent and wherein the adaptive script takes into account the whole input from the user during the natural language interaction when determining the semantics of natural language input from the user;
   constructing at least one command necessary to execute the transaction;
   transmitting the at least one command to at least one information system in order to execute the transaction;
   receiving information about the executed transaction from the at least one information system;
   processing the received information relating to the executed transaction to form a natural language response to the user of the messaging client; and
   sending the natural language response to the messaging client.

2. The method according to claim 1, wherein the script comprises conversational elements, logic functions and needed data objects.

3. The method according to claim 2, further comprising:
   requesting further information, based on the adaptive script, from the user when all data objects of the script cannot be determined.

4. The method according to claim 1, further comprising:
   performing at least one action before relaying the at least one command to the at least one information system or after receiving the information about the executed transaction from the at least one information system.

5. The method according to claim 4, wherein the at least one action comprises at least one of the following:
   assessing authority of the user to conduct the transaction;
   informing the user when the user does not have authority to conduct the transaction;
   assessing a charge for processing the transaction based on at least one of a type of the transaction, frequency of the transaction, time, date, user and enterprise;
   storing a transaction request;
   logging user activity relating to the transaction request;
   authenticating that the user has been granted access to the agent;
   applying an appropriate charge to an appropriate account for collection from a beneficiary of the transaction;
   creating a report for the beneficiary of the transaction; and
   checking the beneficiary that the user is transacting with.

6. The method according to claim 1, when the transaction fails:
   informing the user about a failure of the transaction; and
   requesting additional information from the user via the agent.

7. The method according to claim 1, further comprising:
   using at least one of user information, user status information, historical interaction data between the agent and the user, and the adaptive script of the user to determine at least one of when to initiate interaction with the user and how to initiate interaction with the user.

8. The method according to claim 1, further comprising:
   creating a master agent that combines scripts of multiple other agents.

9. The method according to claim 1, further comprising:
   contacting, with the agent, a third party during the natural language interaction with the user.

10. A computer-readable medium encoded with a computer program, which when executed on a data processing device, is adapted to perform the method according to claim 1.

11. A computer system for interacting with a user of a messaging client, wherein the computer system comprises a transactive engine configured to use user-specific information to initiate, via an agent, a natural language interaction with a user in order to initiate a transaction, to determine, based on an existing form of an adaptive script of the agent, a semantics of natural language input from the user, wherein the existing form of the adaptive script changes after its creation and is adapted to take into account historical interaction between the agent and the user and historical interaction between other users and the agent and wherein the adaptive script takes into account the whole input from the user during the natural language interaction when determining the semantics of natural language input from the user, and to construct at least one command necessary to execute the transaction, to transmit the at least one command to at least one information system in order to execute the transaction, and to receive information about the executed transaction from the at least one information system, to process the received information relating to the executed transaction to form a natural language response to the user, and to send the natural language response to the user.

12. The computer system according to claim 11, wherein the adaptive script comprises conversational elements, logic functions and needed data objects.

13. The computer system according to claim 11, wherein the transactive engine is configured to request further information, based on the adaptive script, from the user when all data objects of the adaptive script cannot be determined.

14. The computer system according to claim 11, wherein the transactive engine is configured to perform at least one action before relaying the at least one command to the at least one information system or after receiving the information about the executed transaction from the at least one information system.

15. The computer system according to claim 14, wherein the transactive engine is configured to perform at least one of the following:
   assess authority of the user to conduct the transaction;
   inform the user when the user does not have authority to conduct the transaction;
   assess a charge for processing the transaction based on at least one of a type of the transaction, frequency of the transaction, time, date, user and enterprise;
   store a transaction request;
   log user activity relating to the transaction request;
   authenticate that the user has been granted access to the agent;
   apply an appropriate charge to an appropriate account for collection from a beneficiary of the transaction;
   create a report for the beneficiary of the transaction; and
   check the beneficiary that the user is transacting with.

16. The computer system according to claim 11, wherein the transactive engine is configured to inform the user about a failure of the transaction, and to request additional information from the user via the agent.

17. The computer system according to claim 11, wherein the transactive engine is configured to use at least one of user information, user status information, historical interaction between the agent and the user, and the adaptive script of the user to determine at least one of when to initiate interaction with the user and how to initiate interaction with the user.

18. The computer system according to claim 11, wherein the transactive engine comprises a master script for a master agent, wherein the master script combines scripts of multiple other agents.

* * * * *